(12) United States Patent
Yamaguchi et al.

(10) Patent No.: US 10,267,422 B2
(45) Date of Patent: Apr. 23, 2019

(54) SEALING DEVICE

(71) Applicant: NOK CORPORATION, Tokyo (JP)

(72) Inventors: Yoshihisa Yamaguchi, Fukushima (JP); Hideharu Hyakutake, Fukushima (JP); Yuya Sakano, Fukushima (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 15/540,470

(22) PCT Filed: Jan. 6, 2016

(86) PCT No.: PCT/JP2016/050186
§ 371 (c)(1),
(2) Date: Jun. 28, 2017

(87) PCT Pub. No.: WO2016/111303
PCT Pub. Date: Jul. 14, 2016

(65) Prior Publication Data
US 2018/0023707 A1 Jan. 25, 2018

(30) Foreign Application Priority Data
Jan. 8, 2015 (JP) ................................. 2015-002202

(51) Int. Cl.
F16J 15/32 (2016.01)
F16J 15/16 (2006.01)
(Continued)

(52) U.S. Cl.
CPC ......... *F16J 15/164* (2013.01); *F16J 15/3204* (2013.01); *F16J 15/3244* (2013.01); *F16J 15/3264* (2013.01); *F16J 15/3456* (2013.01)

(58) Field of Classification Search
CPC ........ F16J 15/164; F16J 15/32; F16J 15/3204; F16J 15/3244; F16J 15/3248
See application file for complete search history.

(56) References Cited

U.S. PATENT DOCUMENTS

| | | | |
|---|---|---|---|
| 2007/0187901 A1* | 8/2007 | Matsui | F16J 15/326 277/551 |
| 2013/0175763 A1* | 7/2013 | Berdichevsky | F16J 15/324 277/552 |
| 2015/0285380 A1* | 10/2015 | Nakagawa | F16J 15/164 277/351 |

FOREIGN PATENT DOCUMENTS

| | | |
|---|---|---|
| CN | 201731067 U | 2/2011 |
| CN | 202301953 U | 7/2012 |

(Continued)

*Primary Examiner* — Gilbert Y Lee
(74) *Attorney, Agent, or Firm* — Harness, Dickey & Pierce, P.L.C.

(57) ABSTRACT

The invention provides a sealing device which can suppress occurrence of static leakage and has a seal lip and a seal flange which are slidably in contact with each other, and a screw groove arranged in an end face, in an axial direction, of the seal flange. In the sealing device, the seal lip attached to a non-rotational housing side is slidably in contact with the end face, in the axial direction, of the seal flange on the rotational axis side, and which has the screw groove arranged in the end face, in the axial direction, of the seal flange so as to exert a fluid pumping action during rotation, is characterized in that the screw groove has an inner-circumferential-side inclined surface and an outer-circumferential-side inclined surface as the internal surfaces, and has a groove bottom part in a circular arc cross-sectional shape that interconnects both of the inclined surfaces.

3 Claims, 5 Drawing Sheets

(51) Int. Cl.
    *F16J 15/3204*     (2016.01)
    *F16J 15/3244*     (2016.01)
    *F16J 15/3264*     (2016.01)
    *F16J 15/34*     (2006.01)

(56) References Cited

FOREIGN PATENT DOCUMENTS

| | | |
|---|---|---|
| JP | H02-113173 A | 4/1990 |
| JP | H03-057563 U | 6/1991 |
| JP | 2014-137129 A | 7/2014 |

\* cited by examiner

FIG. 3A
FIG. 3B
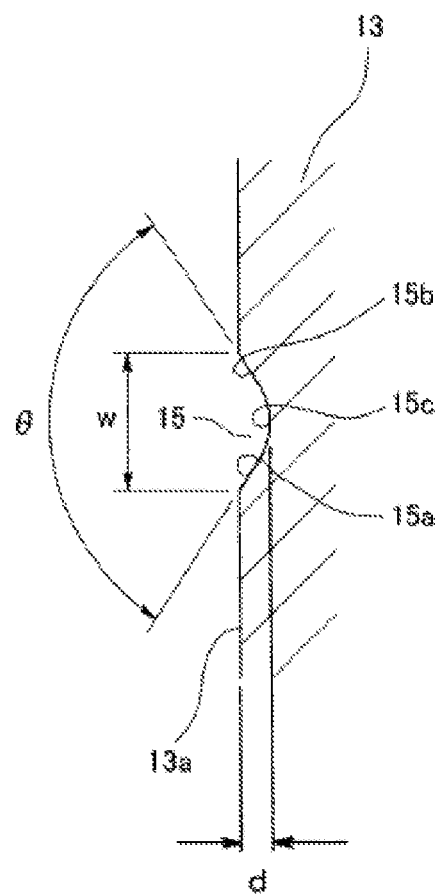
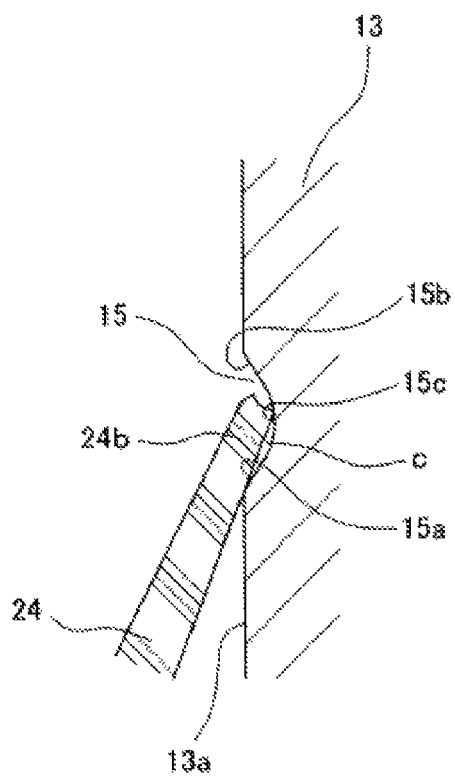

FIG. 5A
FIG. 5B
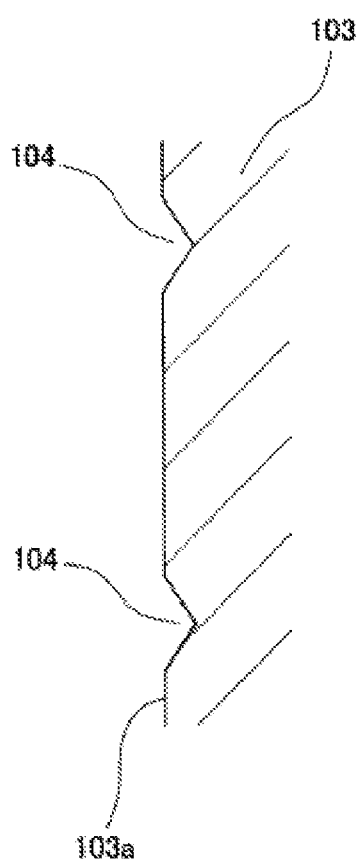
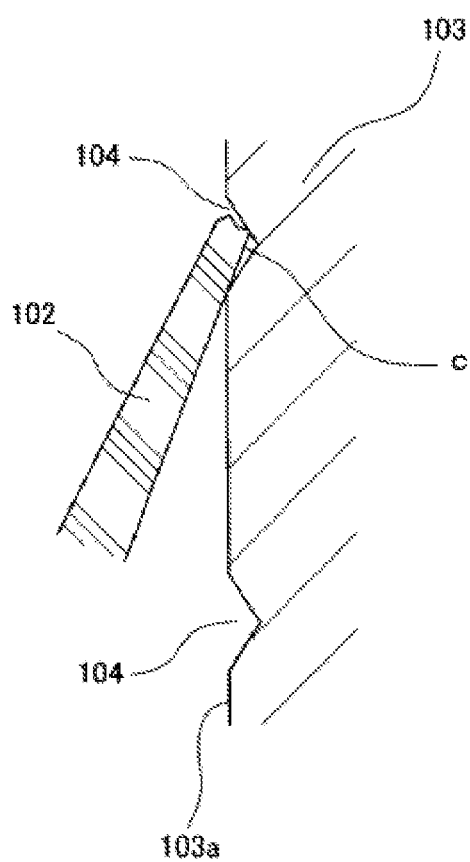

SEALING DEVICE

CROSS-REFERENCE TO RELATED APPLICATIONS

This application is a U.S. National Stage Application of International Application No. PCT/JP2016/050186, filed on Jan. 6, 2016, and published in Japanese as WO 2016/111303 A1 on Jul. 14, 2016, which claims priority to Japanese Application No. 2015-002202, filed on Jan. 8, 2015. The entire disclosures of the above applications are incorporated herein by reference.

BACKGROUND OF THE INVENTION

Field of the Invention

The present invention relates to a sealing device concerning a sealing technique. A sealing device according to the present invention is used, for example, as an oil seal for rotation in fields of an automobile-related industry and multipurpose machinery.

Description of the Conventional Art

Conventionally, there has been known a sealing device 101 having a structure in which a seal lip 102 fitted on a non-rotating housing 51 side is slidably brought into contact with an axial-direction end surface 103a of a seal flange 103 on a rotating shaft 61 side as shown in FIG. 4A. As shown in FIG. 4B, the axial-direction end surface 103a of the seal flange 103 is provided with a screw groove 104 that provides a fluid pumping action due to centrifugal force at a time of rotation of the rotating shaft 61, and the seal lip 102 slidably comes into contact with the axial-direction end surface 103a provided with the screw groove 104.

In the sealing device 101 described above, the seal flange 103 rotating in conjunction with the rotating shaft 61 and provides a fluid shaking-off action due to centrifugal force, and the screw groove 104 provides the fluid pumping action due to centrifugal force at the time of rotation of the rotating shaft 61. Thus, the sealing device 101 can prevent the sealed fluid on the inner side A of the device from leaking to the outer side B of the device through the contacting portion between the seal lip 102 and the seal flange 103.

SUMMARY OF THE INVENTION

Problem to be Solved by the Invention

However, the following functional improvements are demanded for the conventional sealing device 101 described above.

In other words, in the case of the sealing device 101 described above, at the time of rotation of the rotating shaft 61, the seal flange 103, rotating in conjunction with the rotating shaft 61 provides the fluid shaking-off action due to centrifugal force and the screw groove 104 provides the fluid pumping action due to centrifugal force, as described above. Thus, it is possible to prevent the sealed fluid on the inner side A of the device from leaking to the outer side B of the device. However, when the rotating shaft 61 stops rotating, the centrifugal force disappears, and both of the actions described above stop working. This may cause the sealed fluid to travel along the screw groove 104 and pass through the contacting portion, thereby leaking to the outer side B of the device (causing so-called occurrence of static leakage).

As shown in FIG. 5A in an enlarged manner, in the sealing device 101 described above, a cross section of the screw groove 104 is formed into a triangle shape (isosceles triangle with a groove opening portion being a base). Thus, by combining the seal lip 102 with the screw groove 104 as shown in FIG. 5B, a space c having a relatively large cross-sectional area is formed between an inner surface of the screw groove 104 and the seal lip 102. This relatively large space c serves as a leakage path, and leads to occurrence of static leakage.

The present invention is made by taking into consideration of the points described above, and an object of the present invention is to provide a sealing device that can prevent occurrence of static leakage. The sealing device includes a combination of a seal lip and a seal flange, each of which being slidably brought into contact with each other, the seal flange having a screw groove in an axial-direction end surface.

Means for Solving the Problem

The present invention utilizes the following means to achieve the object described above.

Specifically, a sealing device according to the present invention includes a seal lip fitted on a non-rotating housing side and a seal flange on a rotating shaft side, the seal lip being configured to be slidably brought into contact with an axial-direction end surface of the seal flange, the axial-direction end surface of the seal flange including a screw groove providing a fluid pumping action at a time of rotation. In such a sealing device, the screw groove includes an inner surface including an inner-peripheral side slope and an outer-peripheral side slope, and the inner surface further includes a groove bottom portion having an arcuate cross section connecting both the slopes to each other.

In the sealing device according to the present invention, the screw groove providing the fluid pumping action basically has a triangular cross section, and also includes an inner surface partially including a groove bottom portion formed into an arcuate cross section. Therefore, a cross-sectional area of an opening of the screw groove is reduced in comparison with a case where the groove bottom portion formed into the arcuate cross section is not provided and only the triangular cross section is provided. Thus, when the seal lip is combined with the screw groove, a size of a space (cross-sectional area of the opening) formed between the inner surface of the screw groove and the seal lip is reduced, thereby reducing a size of a leakage path, and making the sealed fluid hard to flow.

In the present invention, a very small space is still formed between the inner surface of the screw groove and the seal lip. However, surface tension of the sealed fluid (oil) prevents the sealed fluid from entering the inside of the seal, which makes it possible to almost completely prevent static leakage.

A radius of curvature of an arc shape of the groove bottom portion having an arcuate cross section is preferably set to be greater than a groove depth of the screw groove.

Effect of the Invention

According to the present invention, the sealing device includes the combination of the seal lip and the seal flange, each of which being slidably brought into contact with each other, the seal flange having the screw groove in the axial-direction end surface. In such a sealing device, occurrence of static leakage can be prevented. In addition, the sealing device can prevent the sealed fluid from leaking not only at the time when the rotating shaft is rotating but also at the time when the rotating shaft is at rest.

BRIEF EXPLANATION OF THE DRAWINGS

FIG. 3A is an enlarged cross-sectional view of the screw groove, and FIG. 3B is an enlarged cross-sectional view of a state where a seal lip is combined with the screw groove.

FIG. 4A is a cross-sectional view of main portions of a sealing device according to the conventional example, and FIG. 4B is a diagram for describing a screw groove provided on the sealing device.

FIG. 5A is an enlarged cross-sectional view of the screw groove, and FIG. 5B is an enlarged cross-sectional view of a state where a seal lip is combined with the screw groove.

DETAILED DESCRIPTION OF PREFERRED EMBODIMENTS

Next, an embodiment of the present invention will be described with reference to the drawings.

Figure 1:
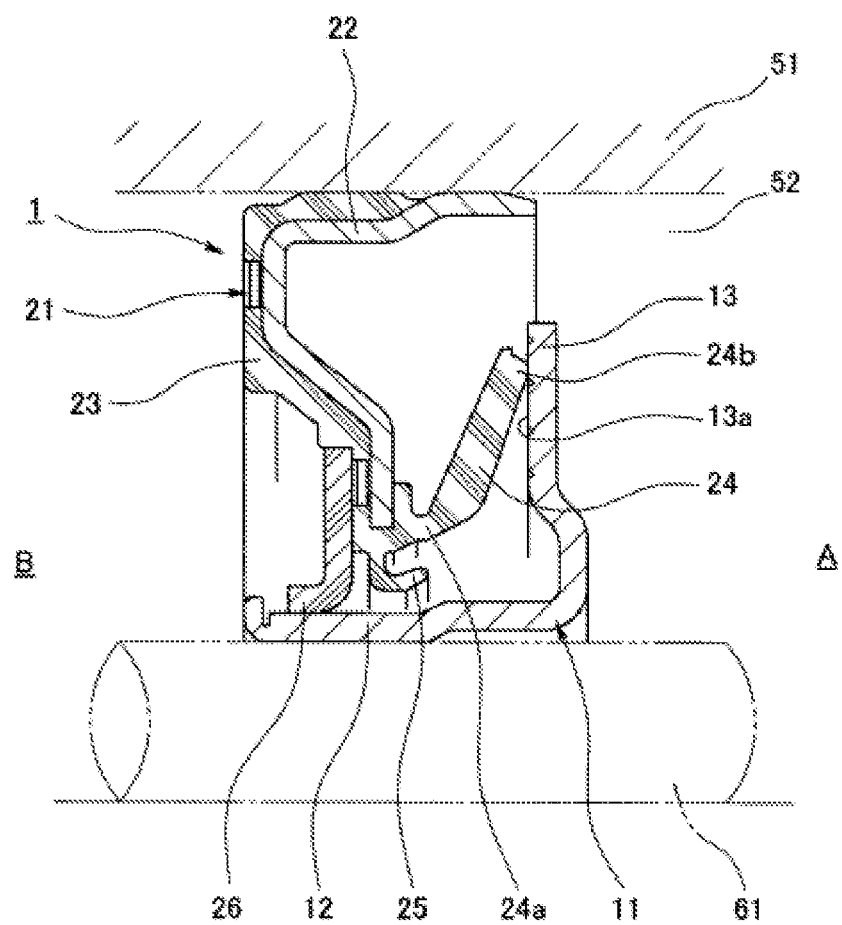
FIG. 1 is a cross-sectional view of main portions of a sealing device according to an embodiment of the present invention.
Figure 2:
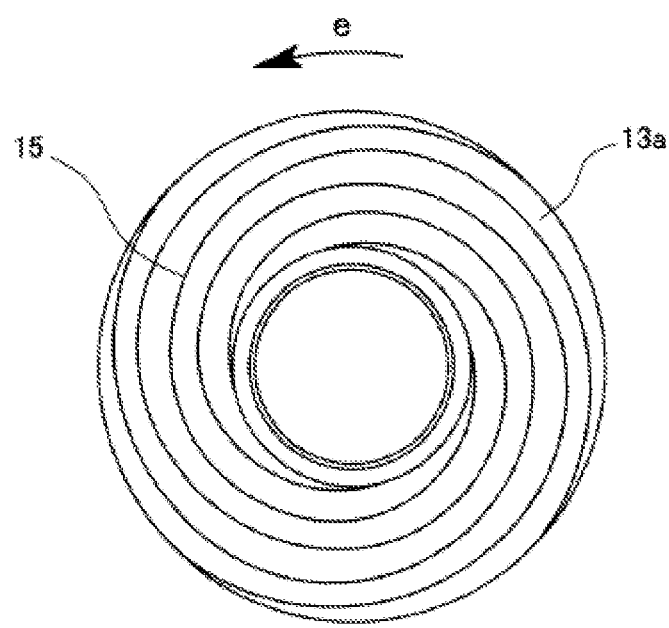
FIG. 2 is a diagram for describing a screw groove provided on the sealing device.
Figure 4A:
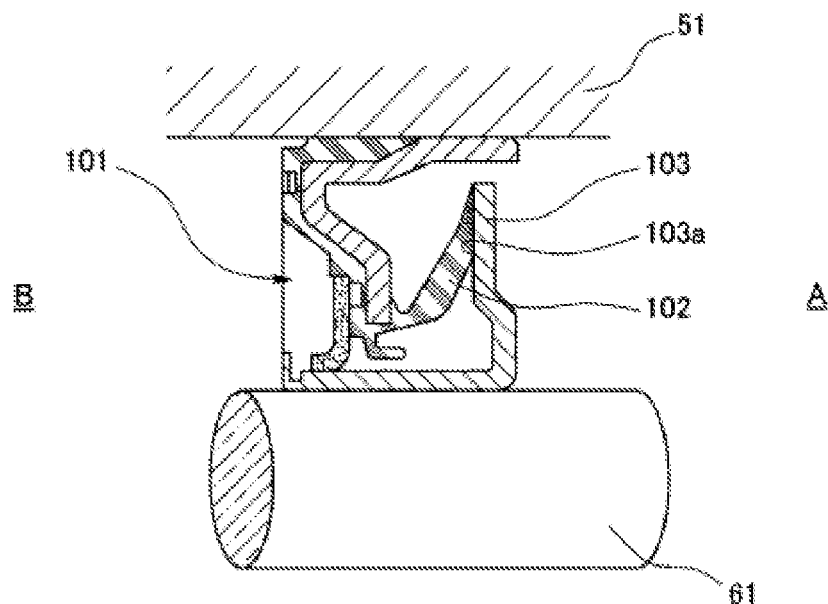
FIGS. 4A and 4B are diagrams showing a conventional example.
Figure 4B:
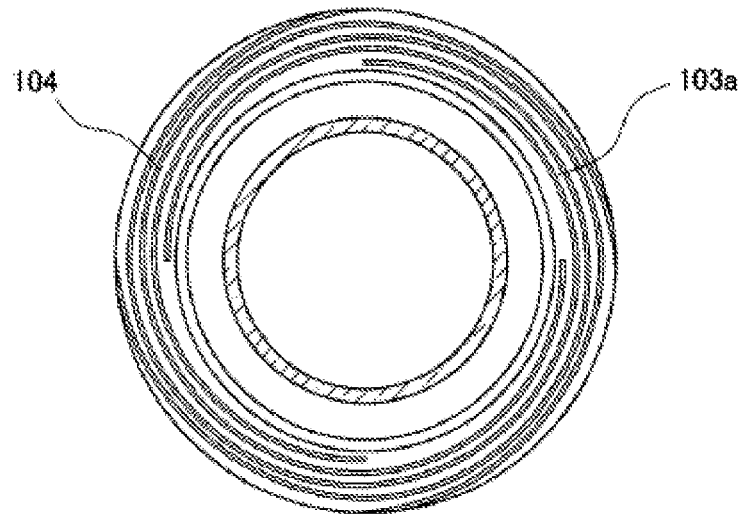

FIG. 1 shows a cross section of main portions of a sealing device 1 according to an embodiment of the present invention.

The sealing device 1 according to the embodiment is a sealing device having a structure in which a seal lip 24 fitted on a non-rotating housing 51 side slidably comes into contact with an axial-direction end surface 13a of a seal flange 13 on a rotating shaft 61 side. Furthermore, the sealing device 1 is a sealing device (oil seal for engine) that seals sealed fluid (oil) on an inner side (oil side) A of the device so that the sealed fluid does not leak to an outer side (atmosphere side) B of the device between a housing (seal housing) 51 and a rotating shaft 61 inserted into a shaft hole 52 provided in the housing 51. In addition, the sealing device 1 includes a combination of a lip seal member 21 fitted on an inner circumference of the shaft hole 52 of the housing 51 with a slinger 11 fitted on an outer circumference of the rotating shaft 61. The lip seal member 21 is provided with the seal lip 24 described in the first aspect, and the slinger 11 is provided with the seal flange described in the first aspect as a flange portion 13.

The slinger 11 is made of a rigid material such as metal, and integrally includes a sleeve portion 12 fixed (fitted) on an outer circumferential surface of the rotating shaft 61 and the outward flange portion 13 provided on one end portion (end portion on the inner side of the device) of the sleeve portion 12 in an axial direction. In addition, a screw groove 15 is provided in the end surface 13a on the outer side of the device which is the other end surface of the flange portion 13 in the axial direction, the screw groove 15 providing an effect of pushing the sealed fluid back toward the outer peripheral side (inner side A of the device) by a fluid pumping action due to centrifugal force at the time of rotation of the rotating shaft 61. An arrow e indicates a rotational direction of the rotating shaft 61.

Meanwhile, the lip seal member 21 includes an attachment ring 22 made of a rigid material such as metal and fixed (fitted) on an inner circumferential surface of the shaft hole 52 of the housing 51, and a rubber-like elastic body 23 attached (vulcanization bonded) to the attachment ring 22. The rubber-like elastic body 23 includes the seal lip (end-surface lip) 24 slidably brought into contact with the end surface 13a on the outer side of the device of the flange portion 13 in the slinger 11 and an oil collecting lip 25 not in contact with the slinger 11, these lips, being integrally provided in the rubber-like elastic body 23. In addition, a dust lip 26 slidably coming into contact with the outer circumferential surface of the sleeve portion 12 in the slinger 11 is incorporated into the rubber-like elastic body 23. The oil collecting lip 25 is disposed on the outer side B of the device with respect to the seal lip 24, and the dust lip 26 is disposed further on the outer side B of the device with respect to the oil collecting lip 25.

The seal lip 24 is disposed on the inner side A of the device and is provided diagonally toward an outside in a radial direction such that a diameter of the seal lip 24 gradually increases from a base end portion 24a thereof to a top end portion 24b. In addition, the inner circumferential surface of the top end portion 24b is in contact with the end surface 13a of the outer side of the device of the flange portion 13. Furthermore, a predetermined interference (contact surface pressure) is set in the contact, and accordingly the seal lip 24 is elastically in contact with the end surface 13a of the outer side of the device in the flange portion 13 with the predetermined interference by the inner circumferential surface of the top end portion 24b of the seal lip 24.

As shown in FIGS. 3A and 3B, which show details of the screw groove 15 that provides the fluid pumping action described above, the screw groove 15 basically has a triangle shape (isosceles triangle with a groove opening portion being a base) in cross section in a direction perpendicular to a longitudinal direction of the screw groove 15. In other words, the screw groove 15 includes an inner-peripheral side slope 15a having a straight shape in cross section and an outer-peripheral side slope 15b also having a straight shape in cross section. In addition, a vertex portion of the triangle is a groove bottom portion 15c having an arcuate cross section (R shape) formed so as to smoothly connect both the side slopes 15a and 15b. With this configuration, as compared with the case of the screw groove 104 only having a triangular cross section as shown in FIGS. 5A and 5B, the screw groove 15 shown in FIGS. 3A and 3B is set to have a cross-sectional area (cross-sectional area of the opening) smaller than that of the screw groove 104 shown in FIGS. 5A and 5B under a condition where a groove width w is constant and a groove opening angle θ is constant (for example, 113 degrees).

A size of the groove bottom portion 15c having an arcuate cross section is set, for example, such that the groove opening angle θ is 130°±5°, a groove depth d is 0.10 mm±0.05 mm, and a radius of curvature R of the arc shape is approximately 0.30 mm±0.05 mm. As a result, the radius of curvature R of the arc shape is set to be greater than the groove depth d.

In the sealing device 1 having the configuration described above, the top end portion 24b of the seal lip 24 is in contact with the end surface 13a of the outer side of the device of the flange portion 13. In this state, when the rotating shaft 61 rotates and the flange portion 13 rotates in a driven manner, the flange portion 13—rotates rotating in conjunction with the rotating shaft 61 provides the fluid shaking-off action due to centrifugal force, and the screw groove 15 provides the fluid pumping action due to centrifugal force. Thus, it is possible to prevent the sealed fluid on the inner side A of the device from passing through the contacting portion between the seal lip 24 and the flange portion 13 and leaking to the outer side B of the device.

Furthermore, when the rotating shaft 61 is at rest, the sealed fluid tends to travel along the screw groove 15 and leak. However, the inner surface of the screw groove 15 partially includes the groove bottom portion 15c having an arcuate cross section as described above, the cross-sectional area of the screw groove 15 is set to be small, and the cross-sectional area of the leakage path is set to be small accordingly. Thus, the sealed fluid is hard to leak. In addition, since a very small space c (FIG. 3B) is also formed between the inner surface of the screw groove 15 and the seal lip 24 in the embodiment, which may lead to a concern of leaking of the sealed fluid through the space c. However, in the very small space c, the sealed fluid (oil) sticks in the vicinity of the space c due to surface tension. Thus, the sealed fluid hardly flows within the screw groove 15. Thus, it is possible to almost completely prevent static leakage.

Therefore, for the reasons described above is possible to prevent occurrence of the static leakage while maintaining the sealing performance at the time of rotation.

In order to enhance the effect of the sealed fluid (oil) sticking in the vicinity of the space c due to surface tension, it is possible to employ a configuration that increases the surface area by using, for example, a shot blasting method or the like to provide a mat-finished portion on the inner surface of the screw groove 15 or the surface of the seal lip 24, each of which forms the vicinity of the space c.

Furthermore, the triangle, which is a basic cross-sectional shape of the screw groove 15, may be a scalene triangle, in addition to the isosceles triangle.

What is claimed is:

1. A sealing device comprising:
   a seal lip fitted on a non-rotating housing side;
   a seal flange on a rotating shaft side;
   the seal lip being configured to be slidably brought into contact with an axial-direction end surface of the seal flange; and
   a screw groove providing a fluid pumping action at a time of rotation, and disposed in the axial-direction end surface of the seal flange,
   wherein the screw groove includes an inner surface including an inner-peripheral side slope and an outer-peripheral side slope, and the inner surface further includes a groove bottom portion having an arcuate cross section connecting both the slopes to each other, and
   a width of the screw groove is sized such that, during the time of rotation, a terminal end of the seal lip is intermittently entirely received within the screw groove.

2. The sealing device according to claim 1, wherein a radius of curvature of an arc shape of the groove bottom portion having the arcuate cross section is set to be greater than a groove depth of the screw groove.

3. The sealing device according to claim 2, wherein the radius of curvature is greater than the groove depth and minimizes formation of a pocket between the seal lip and the inner peripheral side slope when the terminal end of the seal lip is intermittently entirely received within the screw groove.

* * * * *